(12) United States Patent
Fujii

(10) Patent No.: US 7,035,629 B2
(45) Date of Patent: Apr. 25, 2006

(54) USER INTERFACE CONTROL METHOD AND SYSTEM FOR A MOBILE TERMINAL

(75) Inventor: Satoru Fujii, Tokyo (JP)

(73) Assignee: NEC Corporation, Tokyo (JP)

(*) Notice: Subject to any disclaimer, the term of this patent is extended or adjusted under 35 U.S.C. 154(b) by 319 days.

(21) Appl. No.: 10/292,761

(22) Filed: Nov. 13, 2002

(65) Prior Publication Data

US 2003/0100301 A1    May 29, 2003

(30) Foreign Application Priority Data

Nov. 13, 2001 (JP) .............................. 2001-346812

(51) Int. Cl.
*H04H 3/00* (2006.01)
(52) U.S. Cl. ..................... 455/418; 455/419
(58) Field of Classification Search ............. 455/426.2, 455/414.1, 414.3, 418–420, 554.1, 554.2, 455/555, 414.2, 556.1, 556.2, 557, 424–425, 455/456.6, 566
See application file for complete search history.

(56) References Cited

FOREIGN PATENT DOCUMENTS

| GB | 2 336 966 | 11/1999 |
|----|-----------|---------|
| GB | 2 369 701 | 6/2002 |
| JP | 4-98519 | 3/1992 |
| JP | 7-254920 | 10/1995 |
| JP | A 8-147228 | 6/1996 |
| JP | A 9-36976 | 2/1997 |
| WO | 01/60068 | 8/2001 |

*Primary Examiner*—Pablo N. Tran
(74) *Attorney, Agent, or Firm*—Young & Thompson

(57) ABSTRACT

A mobile telephone and an external user interface processing device are connected to a communication network. The external user interface processing device stores a plurality of user interface programs. The mobile telephone transmits key operation event information to the external user interface processing device. The external user interface processing device executes a user interface program to produce a processing result of the key operation event information. The mobile telephone receives the processing result and controls the display according to the received processing result.

13 Claims, 4 Drawing Sheets

USER INTERFACE CONTROL METHOD AND SYSTEM FOR A MOBILE TERMINAL

BACKGROUND OF THE INVENTION

1. Field of the Invention

The present invention relates to a mobile communications system including a plurality of mobile terminals and in particular to user interface control method and system for a mobile terminal.

2. Description of the Related Art

A mobile terminal such as a mobile or portable telephone or a mobile information terminal has a user interface that is the indispensable part of a program for making the mobile terminal easy to use. Since the user interface is frequently updated, it is important to easily change the user interface of each mobile terminal.

For example, Japanese patent application unexamined publication No. 8-147228 discloses an information communication system that is capable of updating and changing a user interface of a terminal via a network. The information communication system is composed of a center station and a plurality of terminals each having user interface sections therein. The center station is provided with a user interface program storage storing a plurality of user interface programs. When having received an information request signal from a terminal, the center station selects an appropriate one of the stored user interface programs and transmits the requested data and the appropriate user interface program to the terminal. The terminal runs the received user interface program to present the received data on the user interface section.

However, the terminal downloads the user interface program from the center station and executes it to provide data on the user interface. Accordingly, it is necessary to provide a mobile telephone with an amount of memory to store the user interface program, resulting in difficulties in reducing the amount of memory incorporated in the mobile telephone.

Japanese patent application unexamined publication No. 9-36976 discloses a telephone communication system composed of a telephone set and a computer. The computer stores a telephone management program including a user interface program. When calling or called, the user interface is displayed on a monitor. In the case of a mobile telephone, however, such a monitor-equipped computer cannot accompany it.

SUMMARY OF THE INVENTION

An object of the present invention is to provide a user interface control method and system allowing easy update of a user interface program in a mobile terminal while reducing in the amount of memory thereof.

According to the present invention, a system includes: a communication network; a plurality of mobile terminals each connectable to the communication network, each of the mobile terminals having a display device and an input device provided therein; and an external user interface processing device connected to the communication network, wherein the external user interface processing device stores at least one user interface program, wherein each of the mobile terminals comprises a controller for transmitting event information generated by the input device to the external user interface processing device, and receiving a processing result of the event information on a use interface program from the external user interface processing device to control the display device according to the processing result.

The event information may include a combination of an operated key code of the input device and a current display image status. The processing result of the event information may include a combination of a displaying command and a next display image status, wherein the displaying command causes a letter indicated by the operated key code to be displayed on the display device of the mobile terminal.

The external user interface processing device preferably stores a plurality of user interface programs, from which a user of each mobile terminal is allowed to previously select a desired user interface program.

Preferably, each of the mobile terminals further has a cache provided therein, wherein the controller instructs the cache to store the processing result of the event information and, when new event information identical to the event information stored in the cache is generated, controls the display device according to the processing result stored in the cache. When new event information is different from the event information stored in the cache, the controller transmits the new event information to the external user interface processing device. When a correction of the user interface program causes the new event information to be different from the event information stored in the cache, the communication network does not charge any communication cost for user interface control between the mobile terminal and the external user interface processing device.

According to another aspect of the present invention, a method for controlling an user interface on a mobile terminal having a display device and an input device provided therein, includes the steps of: a) preparing at least one user interface program in an external user interface processing device allowing communication with the mobile terminal through a communication network; b) when an event occurs through the input device, the mobile terminal transmitting event information generated by the input device to the external user interface processing device; c) when receiving the event information, the external user interface processing device executing a user interface program using the event information to transmit a processing result of the event information back to the mobile terminal; and d) when receiving the processing result of the event information, the mobile terminal controlling the display device according to the processing result.

As described above, user interface programs necessary for a mobile terminal are installed in an external device which the mobile terminal is capable of accessing. Therefore, when a user interface program is updated or corrected, only the user interface program on the external device is updated or corrected and there is no need of updating software on each mobile terminal, allowing easy updating or correction of user interface programs.

Further, since there is no need of memory required for storing a user interface program, it is possible to reduce in the amount of memory provided in a mobile terminal.

Furthermore, since user interface programs are not installed in each mobile terminal but in an external device, a variety of user interface programs can be easily installed, allowing each user to select a desired one from the variety of user interface programs without increasing the amount of memory in the mobile terminal.

As another embodiment, the mobile terminal is provided with a cache, which is used to cache displaying commands and subsequent display image statuses corresponding to previous events generated by operations of an input device.

Accordingly, when the same event occurs, the image transition of the display can be performed without communicating with an external device.

DESCRIPTION OF THE PREFERRED EMBODIMENTS

Figure 1:
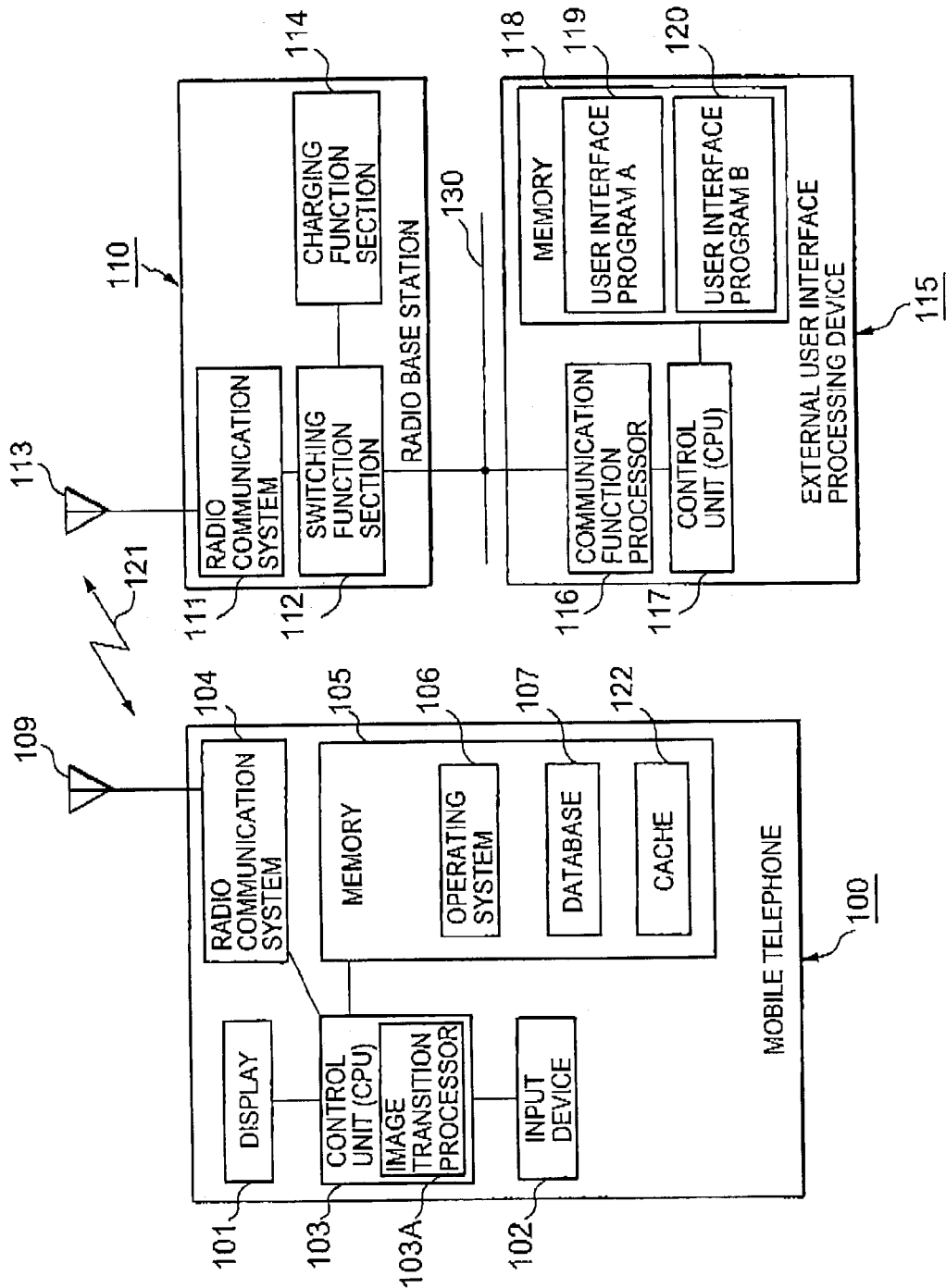
FIG. 1 is a diagram showing a mobile communications system employing a user interface control system according to the present invention.

Referring to FIG. 1, a mobile communications system employs a user interface control system according to the present invention. The mobile communications system is composed of a plurality of mobile telephones, radio base stations, and an external user interface processing section 115. Here, it is assumed that a mobile telephone 100 is located in the radio zone of a radio base station 110, so that the mobile telephone 100 can communicate with the radio base station 110 via a radio channel 121. The radio base station 110 is connected to the external user interface processing section 115 via a network 130 for the mobile communications system.

The mobile telephone 100 is provided with a display 101, an input device 102, a control unit 103, a radio communication system 104 and a memory 105. The display 101 displays an image on screen according to display image information supplied by the control unit 103. The input device 102 may be a keypad including a ten-key or a pointing device to enter information of user's key operation into the control unit 103.

The control unit 103 is composed of a program-controlled processor such as CPU to perform the control operations of the mobile telephone 100 including the display control of the display 101 and the input control of the input device 102. The control unit 103 further includes an image transition processor 103A that controls the image transition on the display 101. The image transition processor 103A may be functionally implemented in the CPU.

As described later, when a key is depressed, the control unit 103 creates transmission data addressed to the external user interface processing section 115, which includes a key code of the depressed key and the current display image status information, and instructs the radio communication system 104 to transmit it to the radio base station 110 through a radio channel. In reverse, when having received new user interface information from the external user interface processing section 115, the control unit 103 decodes it to produce display image data, which is used to display the new user interface on the display 101. The radio communication system 104 allows radio communication with the base station 110 through an antenna 109.

The memory 105 stores an operating system 106, a database 107, and a cache 122. Here, the operating system 106 includes at least one basic user interface program that is used to display an initial user interface on the display 101 in a standby status. The database 107 retrievably stores telephone directory data, image data and/or speech data. Under the control of the control unit 103, the cache 122 is used to store previously received display image information having key operation information as a parameter, which will be described later. It should be noted that the memory 105 does not store any user interface program other than the above basic user interface program.

The radio base station 110 is provided with a radio communication system 111, a switching function section 112, and a charging function section 114. The radio communication system 111 performs radio communications with mobile telephones located within the radio zone thereof. The switching function section 112 performs switching such that a connection is established between each of the mobile terminals and a corresponding end party and further user interface control is performed between a corresponding mobile terminal and the external user interface processing section 115. The charging function section 114 charges communication services to a mobile terminal using the mobile communications system.

The external user interface processing section 115 is provided with a communication function processor 116, a control unit 117 and a memory 118. The memory 118 stores at least one user interface program. In this embodiment, two user interface programs 119 and 120 are stored and, when a mobile terminal 100 is connected to the external user interface processing section 115, a user-desired user interface is executed on the control unit 117 to provide a user interface to the mobile terminal 100. The control unit 117 is composed of a program-controlled processor such as CPU to perform the control operations of the external user interface processing section 115.

As described later, when having received the key code information and the current display image status information from the mobile telephone 100, the control unit 117 executes the user interface program based on the received information and compresses image data generated by the user interface program and sends a displaying command and the compressed image data as a new user interface to the mobile terminal 100.

Figure 2:
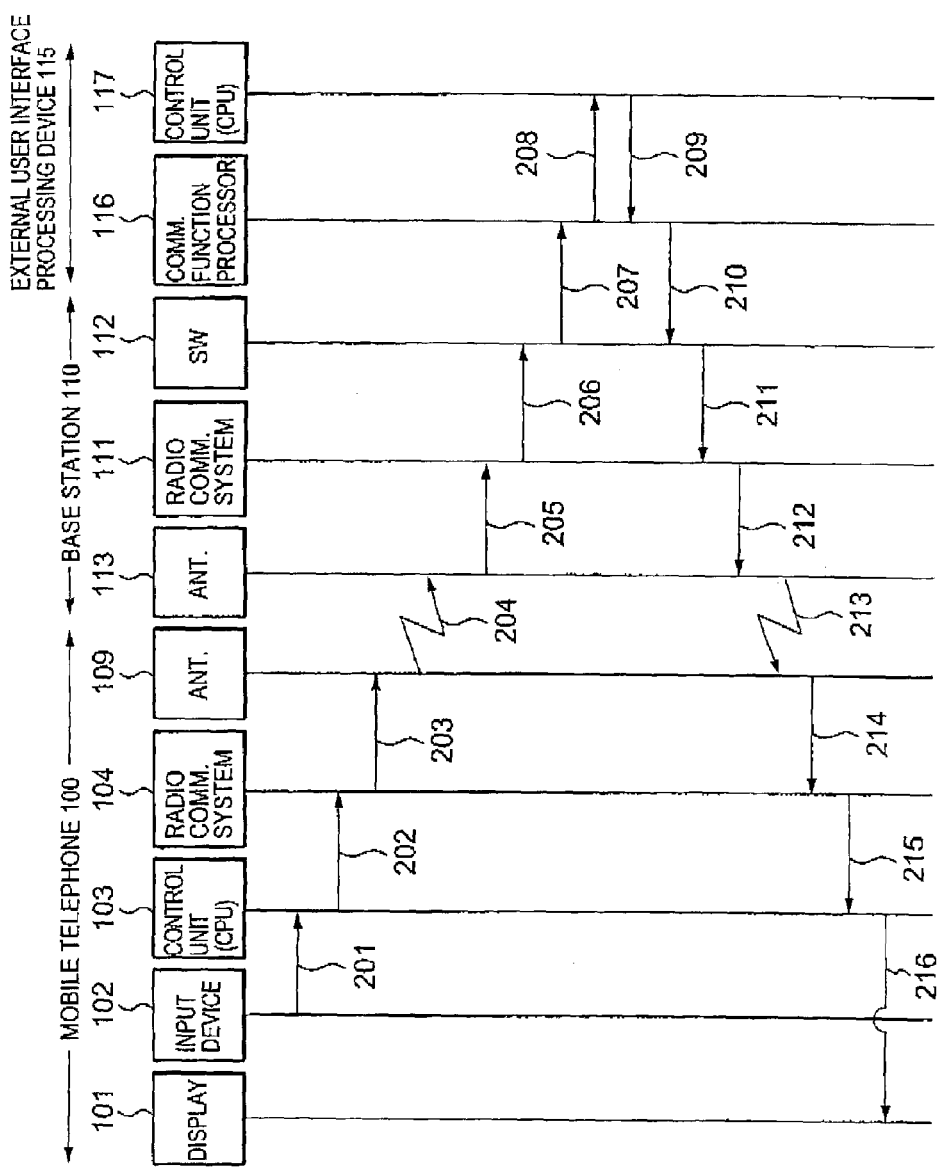
FIG. 2 is a diagram showing a user interface change sequence in a user interface control system according to a first embodiment of the present invention.
Figure 5:
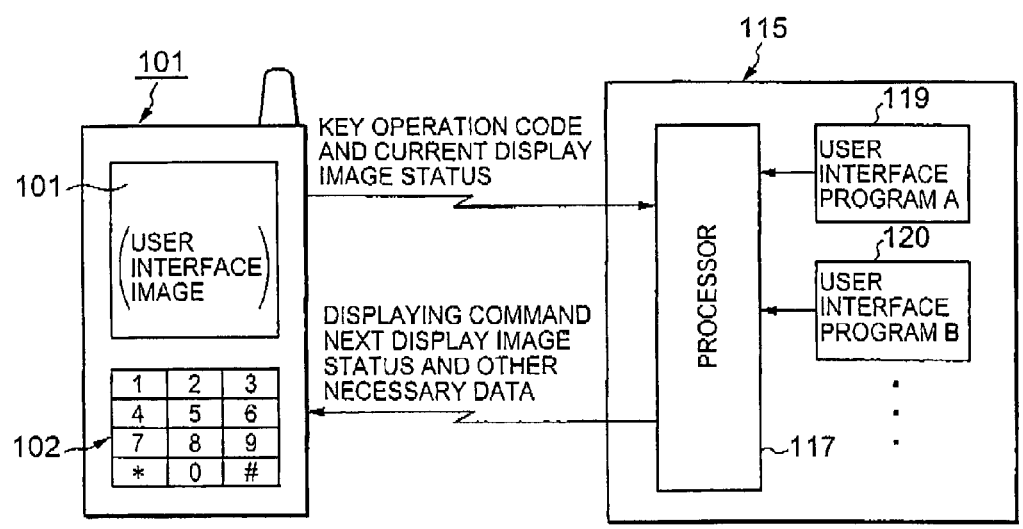
FIG. 5 is a schematic block diagram showing the user interface control system according to the present invention.

Referring to FIG. 2, a screen transition operation will be described in the case where the mobile telephone 100 is put into a calling mode from a standby mode by a user depressing a key. FIG. 5 shows the similar situation in the form of a block diagram.

First, the mobile telephone 100 is in a standby status and therefore the display 101 displays a standby image on screen.

When a key such as an off-hook key or a numeral key has been depressed, the image transition processor 103A of the control unit 103 receives the key code 201 of the depressed key and the standby screen status on screen and encodes them to produce transmission data 202 and transfer it to the radio communication system 104. The radio communication system 104 modulates the transmission data 202 to produce a radio transmission signal 203 on a radio channel, which is transmitted as a radio wave 204 from the antenna 109.

When having received a radio wave 205 through the antenna 113, the radio communication system 111 demodulates it to produce reception data 206, which is transferred to the switching function section 112. The switching function section 112 looks at the destination address of the reception data 206 to determine where to be forwarded. In this case, since the reception data 206 is a user interface query signal including the depressed key code and the standby screen status from the mobile telephone 100, it is forwarded to the external user interface processing section 115 through the network 130.

The external user interface processing section 115 receives reception data 207 at the communication function processor 116. The communication function processor 116 performs protocol conversion of the reception data 207 to produce the user interface query signal 208 including the depressed key code and the standby screen status, which is transferred to the control unit 117.

When having received the depressed key code and the standby screen status, the control unit 117 reads a selected one of the user interface programs 119 and 120 from the memory 118 and executes it using the received key code and standby screen status. For example, when a "1" key of the mobile telephone 100 has been depressed under the standby mode, the key code of "1" and the standby screen status are received by the external user interface processing section 115. The control unit 117 executes the user interface program by inputting the key code of "1" and the standby screen status to produce a reply signal 209 including a displaying command for displaying "1" oil screen, a next screen status (here, a calling screen status) and, in some cases, image data to be displayed on the screen. The image data is compressed before included in the reply signal 209.

In this manner, the control unit 117 outputs the replay signal 209 to the communication function processor 116, which performs protocol conversion of the replay signal 209 to transmit a reply signal 210 to the switching function section 112 of the radio base station 110. The switching function section 112 looks at the destination address of the reply signal 210 to produce transmission data 211 and outputs it to the radio communication system 111. The radio communication system 111 modulates the transmission data 211 to produce a radio transmission signal 212 on a radio channel, which is transmitted as a radio wave 213 from the antenna 113.

When having received a radio wave 214 through the antenna 109, the radio communication system 104 demodulates it to produce reception data 215, which is transferred to the image transition processor 103A of the control unit 103. The reception data 215 includes the displaying command for displaying "1" on screen, the next screen status (here, a calling screen status) and, in some cases, the compressed image data.

The image transition processor 103A decompresses the compressed image data and executes the displaying command in the next screen status (here, the calling screen status) to produce new display control information 216 to be transferred to the display 101. As a result, the screen of the display 101 is changed from the standby mode to the calling mode and the number "1" that was entered by the user depressing the "1" key is displayed on screen.

In this manner, the result of a user's key operation can be displayed on the display 101 through the above-mentioned processes without the need of providing each mobile telephone with the user interface program. Since necessary user interface programs are stored in the external user interface processing device 115 and each mobile terminal has no user interface programs, the user interface programs are allowed to be easily changed or updated.

Further, even if software bugs are found in the user interface program, only the user interface programs stored in the external user interface processing device 115 are debugged and therefore there is no need of rewriting the program installed in each mobile telephone. Revisions made to the user interface program become simplified very much.

Furthermore, since a mobile telephone has no user interface programs installed therein, the amount of memory to be provided in the mobile telephone can be reduced.

A second embodiment of the present invention will be described hereinafter.

The mobile telephone 100 is provided with the cache 122 as shown in FIG. 1. According to the second embodiment, the image transition processor 103A uses the cache 122 of the memory 105 to suppress an increase of traffic in the mobile communications system.

As described before, when any key of the input device 102 is depressed, a new display image status and a displaying command are sent back from the external user interface processing device 115. The image transition processor 103A instructs the cache 122 to store the new display image status and the displaying command which correspond to the depressed key code and the previous displaying image status. In other words, under the control of the image transition processor 103A, an event generated by depressing a key is stored as a parameter onto the cache 122.

A user interface change operation using the cache 122 will be described with reference to FIG. 3.

Figure 3:
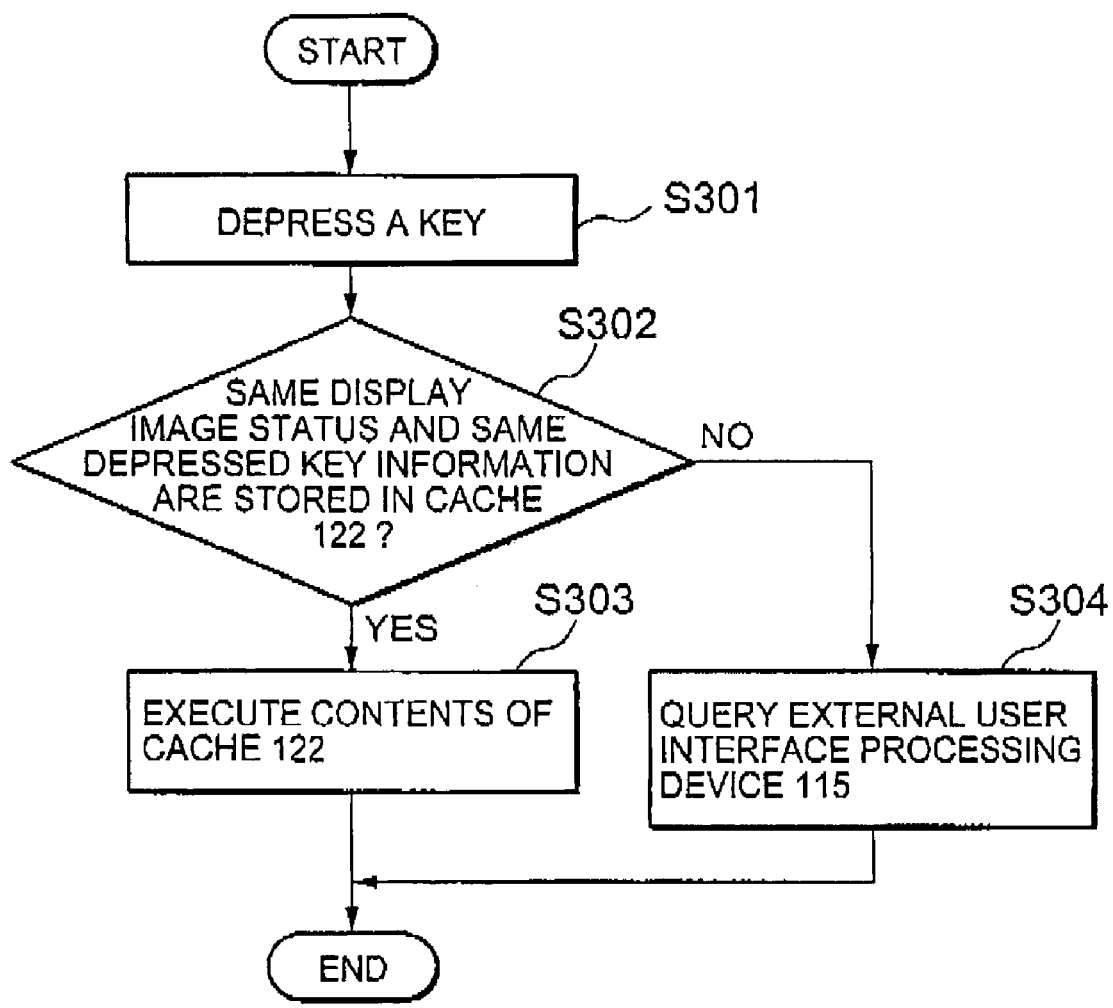
FIG. 3 is a flow chart showing a user interface change operation according to a second embodiment of the present invention.

Referring to FIG. 3, when an event occurs, that is, a key of the input device 102 is depressed (step S301), the image transition processor 103A determines whether the key operation is the same event as stored in the cache 122 (step S302). More specifically, it is determined whether a combination of the depressed key code and the current display image status is found in the cache 122.

When the same event is found in the cache 122 (YES in the step S302), the image transition processor 103A accesses the cache 122 to read the stored reply data including the new display image status and the displaying command that corresponds to the combination of the depressed key code and the current display image status and executes the displaying command in the new display image status (step S303). Accordingly, the display image is changed, for example, from the standby status to the calling status and the letter indicated by the depressed key is displayed at a predetermined position on screen, without performing communication with the external user interface processing device 115.

When the same event fails to be found in the cache 122 (NO at the step S302), the image transition processor 103A queries the external user interface processing device 115 by transmitting the key code of the depressed key and the display image status (step S304).

In the case where the user interface program stored in the external user interface processing device 115 has been updated due to bug correction, it is necessary for the mobile telephone to access the external user interface processing device 115 because the current cache contents cannot be used. In this case, the user incurs communication costs that ought not be basically incurred by the user. To avoid such a case, the charging function section 114 of the radio base station 110 may have a function of detecting such a case so as not to charge the costs on the user.

As a modified embodiment of the present invention, a user interface control system using the Internet will be described with reference to FIG. 4.

Figure 4:
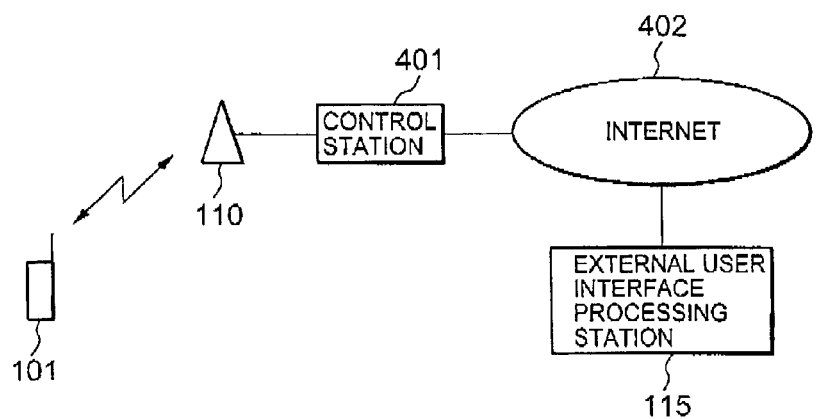
FIG. 4 is a schematic diagram showing a mobile communications system employing a user interface control system according to a modified embodiment of the present invention.

In FIG. 4, an external user interface processing station having the same functions as the external user interface processing device 115 is connected to the Internet 402.

Further, the radio base station 110 is capable of being connected to the Internet 402 through a control station 401.

In the other words, the modified embodiment is different from the first embodiment as shown in FIG. 1 in that the network 130 is replaced with a combination of the control station 401 and the Internet 402 and that the external user interface processing device 115 has a function of connecting to the Internet 402. Accordingly, the user interface control operation is substantially the same as the first embodiment.

The present invention is not limited to a mobile telephone. It is apparent that the present invention can be applied to any type of mobile or portable device in which a user interface on a display is implemented by software program, for example, not only a mobile or portable telephone but also a mobile information terminal such as a PDA (Personal Digital Assistant).

The invention claimed is:

1. A system comprising:
a communication network;
a plurality of mobile terminals each connectable to the communication network, each of the mobile terminals having a display device and an input device provided therein; and
an external user interface processing device connected to the communication network, wherein the external user interface processing device stores at least one user interface program,
wherein each of the mobile terminals comprises a controller for transmitting event information generated by the input device to the external user interface processing device, and receiving a processing result of the event information from the external user interface processing device to control the display device according to the processing result,
the event information includes a combination of an operated key code of the input device and a current display image status,
the processing result of the event information includes a combination of a displaying command and a next display image status, and
the displaying command causes a letter indicated by the operated key code to be displayed in the next display image status on the display device of the mobile terminal.

2. The system according to claim 1, wherein the external user interface processing device stores a plurality of user interface programs, from which a user of each mobile terminal is allowed to previously select a desired user interface program.

3. The system according to claim 1, wherein each of the mobile terminals further has a cache provided therein, wherein the controller instructs the cache to store the processing result of the event information and, when new event information identical to the event information stored in the cache is generated, controls the display device according to the processing result stored in the cache.

4. The system according to claim 3, wherein, when new event information is different from the event information stored in the cache, the controller transmits the new event information to the external user interface processing device.

5. The system according to claim 4, wherein, when a correction of the user interface program causes the new event information to be different from the event information stored in the cache, the communication network does not charge any communication cost for user interface control between the mobile terminal and the external user interface processing device.

6. The system according to claim 1, wherein the communication network includes at least one of a mobile telephone network and Internet.

7. The system according to claim 1, wherein the mobile terminal is a mobile telephone.

8. A method for controlling a user interface on a mobile terminal having a display device and an input device provided therein, comprising the steps of:
a) preparing at least one user interface program in an external user interface processing device allowing communication with the mobile terminal through a communication network;
b) when an event occurs through the input device, the mobile terminal transmitting event information generated by the input device to the external user interface processing device, wherein the event information includes a combination of an operated key code of the input device and a current display image status;
c) when receiving the event information, the external user interface processing device executing a user interface program using the event information to transmit a processing result of the event information back to the mobile terminal, wherein the processing result of the event information includes a combination of a displaying command and a next display image status; and
d) when receiving the processing result of the event information, the mobile terminal controlling the display device according to the processing result such that the displaying command causes a letter indicated by the operated key code to be displayed in the next display image status on the display device.

9. The method according to claim 8, further comprising the steps of:
at the mobile terminal,
e) storing the processing result of the event information onto a cache; and
f) when new event information identical to the event information stored in the cache is generated, controlling the display device according to the processing result stored in the cache.

10. The method according to claim 9, further comprising the steps of:
at the mobile terminal,
g) when new event information is different from the event information stored in the cache, the mobile terminal transmitting the new event information to the external user interface processing device; and
h) repeating the steps c) to g).

11. A mobile terminal connectable to a communication network including an external user interface processing device storing at least one user interface program, comprising:
a display device;
an input device;
a cache; and
a controller for transmitting event information generated by the input device to the external user interface processing device, and receiving a processing result of the event information on a user interface program from the external user interface processing device to control the display device according to the processing result,
wherein the event information includes a combination of an operated key code of the input device and a current display image status, and the processing result of the event information includes a combination of a displaying command and a next display image status,
wherein the displaying command causes a letter indicated by the operated key code to be displayed in the next display image status on the display device of the mobile terminal.

12. The mobile terminal according to claim 11, wherein the controller instructs the cache to store the processing result of the event information, and when new event information identical to the event information stored in the cache is generated, controls the display device according to the processing result stored in the cache.

13. The mobile terminal according to claim 12, wherein, when new event information is different from the event information stored in the cache, the controller transmits the new event information to the external user interface processing device.

* * * * *